(12) United States Patent
Kinoshita et al.

(10) Patent No.: US 9,706,175 B2
(45) Date of Patent: Jul. 11, 2017

(54) IMAGE PROCESSING DEVICE, IMAGE PROCESSING SYSTEM, AND IMAGE PROCESSING METHOD

(75) Inventors: Kohtaroh Kinoshita, Kobe (JP);
Masahiro Koharazawa, Kobe (JP);
Sunja Imu, Kobe (JP)

(73) Assignee: FUJITSU TEN LIMITED, Hyogo (JP)

( * ) Notice: Subject to any disclaimer, the term of this patent is extended or adjusted under 35 U.S.C. 154(b) by 471 days.

(21) Appl. No.: 13/517,118

(22) PCT Filed: Dec. 22, 2010

(86) PCT No.: PCT/JP2010/073078
§ 371 (c)(1),
(2), (4) Date: Jun. 19, 2012

(87) PCT Pub. No.: WO2011/078201
PCT Pub. Date: Jun. 30, 2011

(65) Prior Publication Data
US 2012/0257058 A1    Oct. 11, 2012

(30) Foreign Application Priority Data
Dec. 24, 2009    (JP) .................. 2009-291878

(51) Int. Cl.
*H04N 7/18*    (2006.01)
*G01C 21/36*    (2006.01)
(Continued)

(52) U.S. Cl.
CPC ......... *H04N 7/181* (2013.01); *G01C 21/3647* (2013.01); *G06T 3/0012* (2013.01);
(Continued)

(58) Field of Classification Search
CPC ......... H04N 7/18; H04N 7/181; G06T 3/0012
See application file for complete search history.

(56) References Cited

U.S. PATENT DOCUMENTS 7,161,616 B1 *   1/2007   Okamoto .................. B60R 1/00
                                                             348/148
7,634,110 B2 *  12/2009   Oka ......................... B60R 1/00
                                                             348/148
(Continued)

FOREIGN PATENT DOCUMENTS

JP    B2-3300334    7/2002
JP    A-2003-267171    9/2003
(Continued)

OTHER PUBLICATIONS https://www.opengl.org/discussion_boards/showthread.php/127292-rotating-a-camera-around-the-origin-(using-glutLookAt).*

(Continued)

*Primary Examiner* — Joseph Becker
(74) *Attorney, Agent, or Firm* — Oliff PLC

(57) ABSTRACT

In an image processing device configured to be installed in a vehicle, an image acquirer acquires camera images captured by cameras provided on the vehicle. A synthetic image generator generates synthetic images, which include downward views of the vehicle and a periphery thereof viewed from viewpoints different from one another, based on the camera images. A display image provider outputs, to the display device installed in the vehicle, information corresponding to a display image in which the synthetic images are continuously reproduced.

17 Claims, 12 Drawing Sheets

(51) Int. Cl.
*G08G 1/16* (2006.01)
*G06T 3/00* (2006.01)
(52) U.S. Cl.
CPC ............ *G08G 1/165* (2013.01); *G08G 1/166* (2013.01); *B60R 2300/105* (2013.01)

(56) References Cited

U.S. PATENT DOCUMENTS

| | | | |
|---|---|---|---|
| 2003/0021490 A1* | 1/2003 | Okamoto et al. | 382/284 |
| 2008/0136911 A1* | 6/2008 | Shaffer | H04N 7/181 348/148 |
| 2009/0096937 A1* | 4/2009 | Bauer et al. | 348/739 |

FOREIGN PATENT DOCUMENTS

| | | |
|---|---|---|
| JP | A-2005-236493 | 9/2005 |
| JP | A-2006-41741 | 2/2006 |
| JP | A-2008-219559 | 9/2008 |
| JP | A-2009-71790 | 4/2009 |
| JP | A-2009-253460 | 10/2009 |
| WO | WO 2009/144994 A1 | 12/2009 |

OTHER PUBLICATIONS

International Search Report issued in International Patent Application No. PCT/JP2010/073078 dated Feb. 15, 2011.
Nov. 15, 2014 Office Action issued in Chinese Application No. 201080059089.9.
May 13, 2015 Office Action issued in Chinese Patent Application No. 201080059089.9.

\* cited by examiner

IMAGE PROCESSING DEVICE, IMAGE PROCESSING SYSTEM, AND IMAGE PROCESSING METHOD

TECHNICAL FIELD

The present invention relates to a technology to display an image on a display device installed in a vehicle.

BACKGROUND ART

In general, there is a device that enables a user to monitor a periphery of a vehicle through acquiring images of the periphery of the vehicle through cameras installed on the vehicle and displaying the acquired images on a display device automatically or by a user's operation. Further, there is a device that provides a means for confirming safety around the whole periphery of a vehicle to a user through displaying a downward view that is viewed from directly above of the vehicle on a screen as a virtual viewpoint. Further, for example, Japanese Unexamined Patent Application Publication No. 2008-219559 (Patent Document 1) discloses a technology to confirm the safety around a vehicle with two screens including a first screen that displays viewpoint positions of images captured by cameras installed on the vehicle at predetermined height together with an overall view of the vehicle and a second screen that displays respective camera images corresponding to movement of the viewpoint positions displayed on the first screen.

SUMMARY OF INVENTION

Problems to be Solved by Invention

However, according to the display of images of the periphery of the vehicle through the cameras in the related art, it is necessary to confirm which direction of the vehicle the images from the respective cameras correspond to, and since the user's vehicle is not displayed on the screen, it is difficult for the user to grasp the positional relationship such as the distance between the vehicle and obstacles that are present on the periphery of the vehicle.

Further, in the case of displaying the downward view that is viewed from directly above of the vehicle on the screen as the virtual viewpoint, it is necessary for the user to confirm a wide range around the whole periphery of the vehicle to cause an excessive amount of information to be provided to the user, and as a result, it is difficult to narrow the point where the user should be careful.

Further, according to the technology disclosed in Patent Document 1, since the screen that displays the viewpoint positions of the images captured by the cameras together with the overall view of the vehicle and the screen that displays the respective camera images corresponding to the movement of the viewpoint positions are displayed as separate screens, the user should perform the mapping of the information displayed on the two screens, and this causes the problem that it is difficult for the user to grasp the positional relationship between the vehicle and the obstacles.

Accordingly, the present invention has been made in consideration of the above-described situations, and an object is to provide a technology that enables a user to intuitively grasp the positional relationship between a vehicle and obstacles that are present on the periphery of the vehicle.

Means for Solving Problems

In order to solve the problems, according to the invention, there is provided the following configurations.

(1): An image processing device configured to be installed in a vehicle, comprising:
an image acquirer configured to acquire camera images captured by cameras provided on the vehicle;
a synthetic image generator configured to generate synthetic images based on the camera images, the synthetic images including first downward views of the vehicle and a periphery thereof viewed from viewpoints different from one another; and
a display image provider configured to output, to a display device installed in the vehicle, information corresponding to a display image in which the synthetic images are continuously reproduced.

(2): The image processing device according to (1), wherein the synthetic images includes a second downward view of the vehicle and the periphery thereof viewed from right above of the vehicle; and
wherein the second downward view is reproduced at least once while the first downward views are reproduced, as the display image.

(3): The image processing device according to (1) or (2), wherein each of the first downward views shows the vehicle at a center thereof.

(4): The image processing device according to any one of (1) to (3), wherein the synthetic image generator is configured to generate the synthetic images when the image processing device is activated.

(5): The image processing device according to any one of (1) to (4), wherein the synthetic image generator is configured to eliminate a part of the camera images having a brightness lower than a reference value when the synthetic image is generated.

(6): An image processing system comprising:
a plurality of cameras configured to be provided on a vehicle; and
an image processing device configured to be installed in the vehicle, comprising:
an image acquirer configured to acquire camera images captured by the cameras;
a synthetic image generator configured to generate synthetic images based on the camera images, the synthetic images respectively being downward views of the vehicle and a periphery thereof viewed from viewpoints different from one another; and
a display image provider configured to output, to a display device installed in the vehicle, information corresponding to a display image in which the synthetic images are continuously reproduced.

(7): An image processing method, comprising:
acquiring camera images captured by cameras provided on a vehicle;
generating synthetic images based on the camera images, the synthetic images respectively being downward views of the vehicle and a periphery thereof viewed from viewpoints different from one another; and
outputting, to a display device installed in the vehicle, information corresponding to a display image in which the synthetic images are continuously reproduced.

Advantageous Effects of Invention

According to the configuration of (1) or (7), an image can be provided, from which a user can grasp the positional relationship between a vehicle and obstacles which are displayed in three dimensions as if the user saw them from above. Further, by reproducing the viewpoint movement through continuous reproduction of synthetic images that take bird's-eye views of the vehicle, the user can intuitively grasp the positional relationship between the vehicle and the obstacles.

Further, according to the configuration of (2), even if information such as the obstacles is overlooked when the viewpoint movement is displayed, it is possible to make a safety confirmation again from a position of directly above of the vehicle.

Further, according to the configuration of (3), the user can confirm the obstacles on the whole periphery of the vehicle on one screen.

Further, according to the configuration of (4), at the startup of the image processing device which is usually before the start of operation, the user can smoothly confirm the obstacles on the whole periphery of the vehicle.

Further, according to the configuration of (5), unintended shading (mechanical vignetting) can be prevented from appearing in the synthetic image, and thus the synthetic images can be provided, from which the user can intuitively grasp the positional relationship between the vehicle and the obstacles.

MODE TO CARRY OUT INVENTION

Hereinafter, preferred embodiments of the present invention will be described in detail with reference to the accompanying drawings.

<1-1. System Configuration>

Figure 1:
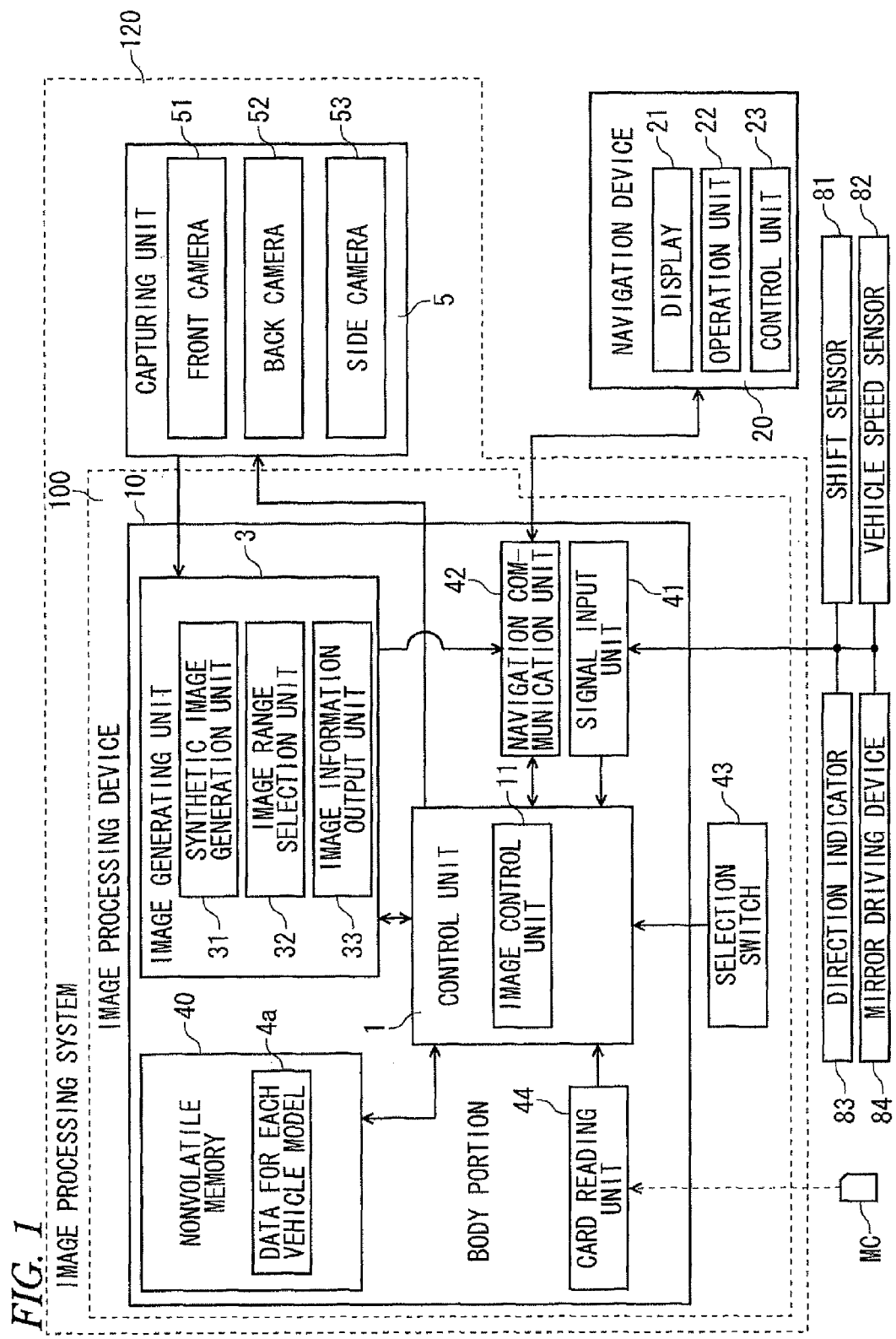
FIG. 1 is a diagram illustrating the configuration of an image processing device.

FIG. 1 is a block diagram illustrating the configuration of an image processing system 120. This image processing system 120 is installed in a vehicle (in an embodiment of the present invention, a car), and has a function of generating an image through capturing images of a periphery of a vehicle and outputting the generated image to a display device such as a navigation device 20 in a cabin. A user (representatively, a driver) of the image processing system 120 can grasp the appearance of the periphery of the vehicle substantially in real time by using the image processing system 120.

As illustrated in FIG. 1, the image processing system 120 mainly includes an image processing device 100 configured to generate peripheral images showing the periphery of the vehicle and to output image information to a display device such as a navigation device 20 or the like, and a capturing unit 5 configured to be provided with cameras capturing images around the vehicle.

The navigation device 20 performs navigation guidance for a user, and includes a display 21 such as a liquid crystal display having a touch panel function, an operation unit 22 for user's operation, and a control unit 23 controlling the whole device. The navigation device 20 is provided on an instrument panel or the like of the vehicle so that the user can recognize the screen of the display 21. Various kinds of instructions from the user are received by the operation unit 22 and the display 21 as the touch panel. The control unit 23 is configured as a computer having a CPU, a RAM, a ROM, and the like, and various kinds of functions including the navigation function are realized as the CPU performs arithmetic processing according to a predetermined program.

The navigation device 20 is communicably connected with the image processing device 100, and performs transmission and reception of various kinds of control signals with the image processing device 100 and reception of peripheral images generated by the image processing device 100. On the display 21, images based on the stand-alone function of the navigation device 20 are typically displayed, and the peripheral images showing the appearance of the periphery of the vehicle generated by the image processing device 100 under a predetermined condition. Through this, the navigation device 20 also functions as a display device for receiving and displaying the peripheral images generated by the image processing device 100.

The image processing device 100 includes a body portion 10 in which an ECU (Electronic Control Unit) having a function of generating peripheral images is provided, and is arranged on a predetermined position of the vehicle. The image processing system 120 is provided with the capturing unit 5 capturing the images of the periphery of the vehicle, and functions as an image generation device that generates synthetic images viewed from a virtual viewpoint on the basis of the captured images obtained by capturing the image of the periphery of the vehicle through the capturing unit 5. Vehicle cameras 51, 52, and 53 provided in the capturing unit 5 are arranged on appropriate positions of the vehicle, which differ from the body portion 10, and the details thereof will be described later.

The body portion 10 of the image processing device 100 mainly includes a control unit 1 controlling the whole device, an image generation unit 3 (image acquisition means in the present invention) generating the peripheral images for display through processing the captured images acquired by the capturing unit 5, and a navigation communication unit 42 communicating with the navigation device 20.

Various kinds of instructions from the user, which are received by the operation unit 22 or the display 21 of the navigation device 20, are received by the navigation communication unit 42 and are input to the control unit 1 as control signals. Further, the image processing device 100 includes a selection switch 43 that receives an instruction to switch the display contents from the user. The signal that indicates the user's instruction is also input from the selection switch 43 to the control unit 1. Through this, the image processing device 100 can operate in response to both the user's operation with respect to the navigation device 20 and the user's operation with respect to the selection switch 43.

The selection switch 43 is arranged on an appropriate position of the vehicle that differs from the body portion 10.

The image generation unit 3 is configured as a hardware circuit that can perform various kinds of image processing, and includes a synthetic image generation unit 31, an image range selection unit 32, and an image information output unit 33.

The synthetic image generation unit 31 functions as a synthetic image generation means according to the present invention, and generates the synthetic images viewed from a certain virtual viewpoint around the vehicle on the basis of captured images (camera images) acquired by the vehicle cameras 51, 52, and 53 of the capturing unit 5. The technique of generating the synthetic images viewed from the virtual viewpoint through the generation unit 31 will be described later.

The image range selection unit 32 selects and cuts off a predetermined range of the image on the basis of the captured image acquired by the side camera 53 of the capturing unit 5. Here, in the case where a door mirror is closed, the predetermined range of the image is an image range which contains an image of an object that is almost the same as the range that is reflected in the door mirror that is in an opened state. In other word, the predetermined range of the image is an image range showing the rear of the side area of the vehicle. Through this, even in a state where the door mirror is closed while the vehicle passes through a narrow place, the user can confirm the image in the range of almost the same as that in the case where the door mirror is opened.

Further, in the case where the door mirror 93 is opened, the predetermined range of the image is an image range that contains an outer side of a front fender of the vehicle 9. Through this, the user can easily confirm the situation of an area to be confirmed in the case of moving the vehicle toward the roadside.

The image information output unit 33 outputs image information that is selected by the image range selection unit 32 to the navigation device 20 through the navigation communication unit 42. On the other hand, the output of the image information is performed on the basis of the control unit 1. Further, in the case of selecting the predetermined range of the image, parameters for each vehicle model (the positions of the side cameras 53 that are attached to left and right door mirrors, which are changed depending on the opening and closing of the door mirrors, data of the angles of optical axes that are changed depending on the opening and closing of the door mirrors, and the like, for each vehicle model) stored in a nonvolatile memory 40 to be described later are used.

Further, the image information output unit 33 functions as a display image providing means according to the present invention, and outputs synthetic image information (display image) generated by the synthetic image generation unit 31 to the navigation device 20. Through this, the peripheral images showing the periphery of the vehicle are displayed on the display 21 of the navigation device 20.

The control unit 1 is configured as a computer having a CPU, a RAM, a ROM, and the like, and various kinds of control functions are realized as the CPU performs arithmetic processing according to a predetermined program. The image control unit 11 shown in the drawing corresponds to one of functions of the control unit 1 realized as described above.

The image control unit 11 controls the image processing that is executed by the image generation unit 3. For example, the image control unit 11 instructs various kinds of parameters that are required to generate the synthetic images generated by the synthetic image generation unit 31. Further, the image range selection unit 32 performs an instruction to select the predetermined range of the image captured by the side camera 53 on the basis of information on the opening or closing state of the door mirror and the parameter for each vehicle model.

Further, the body portion 10 of the image processing apparatus 100 additionally includes the nonvolatile memory 40, a card reading unit 44, and a signal input unit 41, which are connected to the control unit 1.

The nonvolatile memory 40 is configured as a flash memory or the like that can keep the stored contents even when the electric power is turned off. In the nonvolatile memory 40, data 4a for each vehicle model is stored. The data 4a for each vehicle model may be data according to the vehicle model that is required when the synthetic image generation unit 31 generates the synthetic images, or data of the positions of the side cameras 53 that are attached to the left and right door mirrors, which are changed depending on the opening and closing of the door mirrors, and data of the angles of optical axes that are changed depending on the opening and closing of the door mirrors, and the like, for each vehicle model.

The card reading unit 44 reads a memory card MC that is a portable recording medium. The card reading unit 44 includes a card slot in which the memory card MC is removably mounted, and reads data recorded on the memory card MC that is mounted in the card slot. The data read by the card reading unit 44 is input to the control unit 1.

The memory card MC is composed of a flash memory or the like that can store various kinds of data, and the image processing device 100 can use the various kinds of data stored in the memory card MC. For example, by storing a program in the memory card MC and reading the program from the memory card MC, it becomes possible to update the program (firmware) that realizes the function of the control unit 1. Further, by storing, in the memory card MC, data for each vehicle model that corresponds to a vehicle model that is different from that of the data 4a for each vehicle model stored in the nonvolatile memory 40, and reading and storing the data in the nonvolatile memory 40, it becomes possible to make the image processing system 120 correspond to a different kind of vehicle model.

Further, signals from various kinds of devices provided in the vehicle are input to the signal input unit 41. Through this signal input unit 41, the signals from the outside of the image display system 120 are input to the control unit 1. Specifically, the signals indicating various kinds of information are input from a shift sensor 81, a vehicle speed sensor 82, a direction indicator 83, and a mirror driving device 84 to the control unit 1.

From the shift sensor 81, positions of operations of a shift lever of a transmission of the vehicle 9, that is, shift positions of "P (Park)", "D (Drive)", "N (Neutral)", and "R (Reverse)", are input. From the vehicle speed sensor 82, a traveling speed (km/h) of the vehicle 9 at that time is input.

From the direction indicator 83, a turn signal that indicates a turning direction on the basis of the operation of a turn signal switch, that is, a turning direction that is intended by a vehicle driver, is input. When the turn signal switch is operated, a turn signal is generated, and the turn signal indicates the operated direction (left direction or right direction). When the turn signal switch is in a neutral position, the turn signal is turned off.

Further, the mirror driving device 84 closes or opens the door mirror of the vehicle in response to the operation of the driver. From the mirror driving device 84, a door mirror state (closed/opened) signal is input.

<1-2. Capturing Unit>

Then, the capturing unit 5 of the image processing system 120 will be described in detail. The capturing unit 5 is electrically connected to the control unit 1, and operates on the basis of the signal from the control unit 1.

The capturing unit 5 includes vehicle cameras, that is, a front camera 51, a back camera 52, and side cameras 53. The vehicle cameras 51, 52, and 53 are provided with image pickup devices, such as CCD or CMOS, and electronically acquire images.

Figure 2:
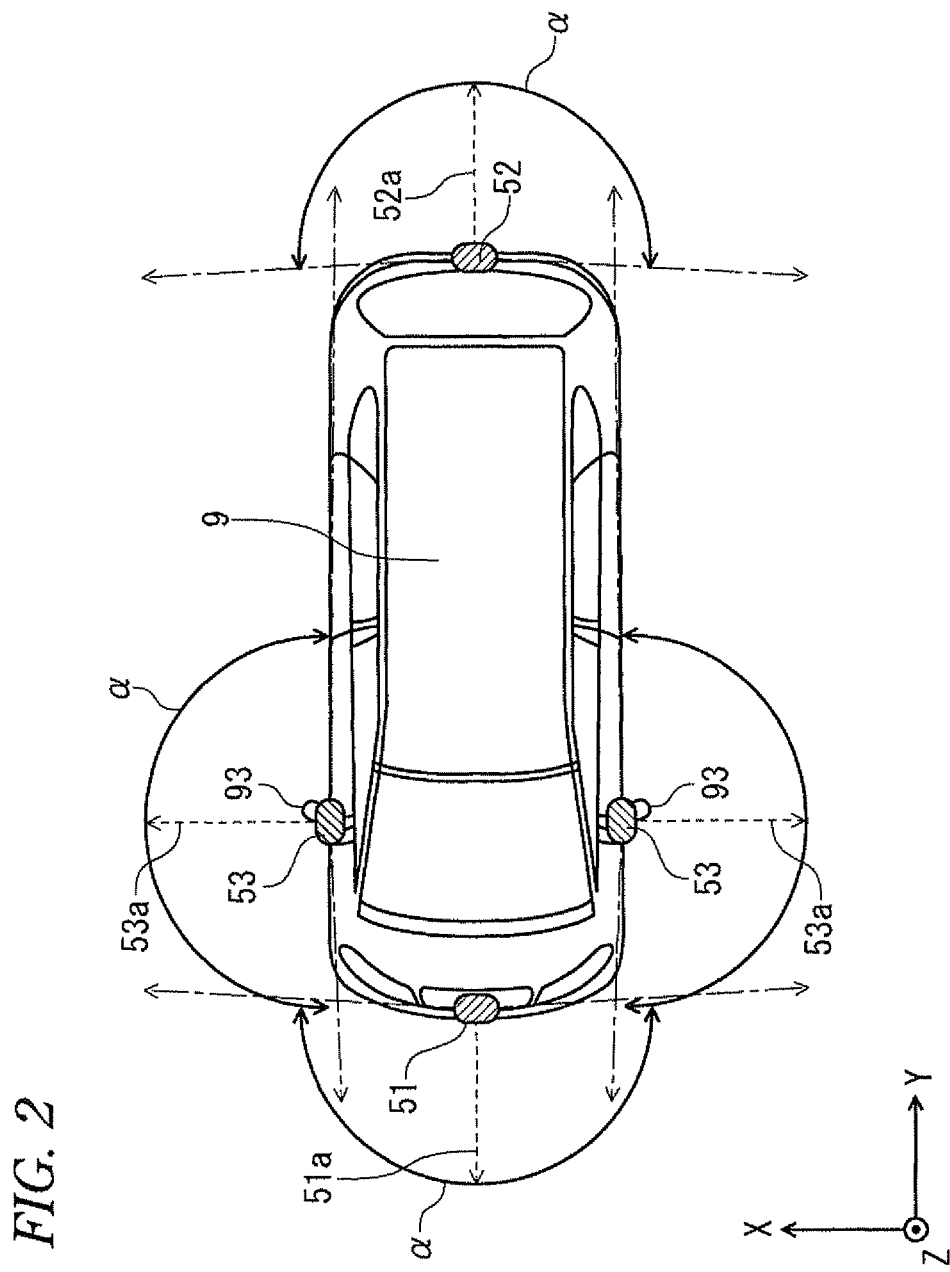
FIG. 2 is a view illustrating positions on which vehicle cameras are installed in a vehicle.

FIG. 2 is a view illustrating positions on which the vehicle cameras 51, 52, and 53 are installed. In the following description, when describing the orientation and direction, three-dimensional XYZ orthogonal coordinates as shown in the drawing are appropriately used. The XYZ axes are relatively fixed against the vehicle 9. Here, the X-axis direction is along the left/right direction of the vehicle 9, the Y-axis direction is along the forward/rearward direction of the vehicle 9, and the Z-axis direction is along the vertical direction. Further, for convenience, it is assumed that +X side is the right side of the vehicle 9, +Y side is the rear side of the vehicle 9, and +Z side is the upper side.

The front camera 51 is provided in the vicinity of the mounting position of the vehicle license plate at the front end of the vehicle 9, and its optical axis 51a is directed in the straight direction (−Y side in the Y-axis direction as viewed in a plane) of the vehicle 9. The back camera 52 is provided in the vicinity of the mounting position of the vehicle license plate at the rear end of the vehicle 9, and its optical axis 52a is directed in the opposite direction (+Y side in the Y-axis direction as viewed in a plane) of the straight direction of the vehicle 9. Further, the side cameras 53 are provided on the left and right door mirrors 93, and its optical axis 53a is directed to the outside along the left/right direction (the X-axis direction as viewed in a plane) of the vehicle 9. On the other hand, although it is preferable that the attachment position of the front camera 51 or the back camera 52 is substantially at the center of the vehicle, it may be shifted somewhat to the left or right direction from the center of the vehicle.

Fish-eye lenses are adopted as lenses of the vehicle cameras 51, 52, and 53, and the vehicle cameras 51, 52, and 53 have an angle α of view of 180 degrees or more. Accordingly, by using the four vehicle cameras 51, 52, and 53, it is possible to capture images of the whole periphery of the vehicle 9.

Figure 3:
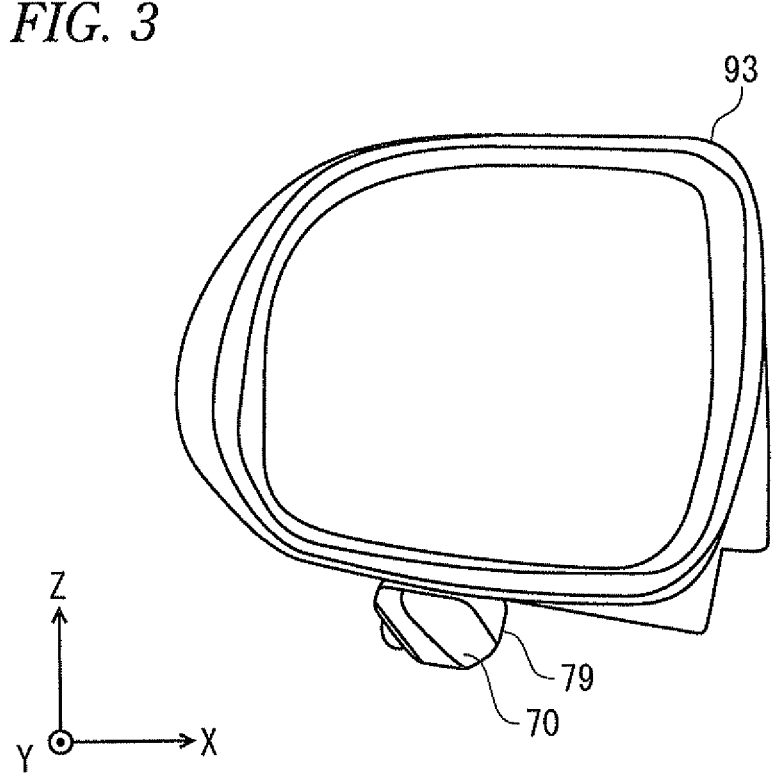
FIG. 3 is a view illustrating the external configuration of a side camera unit in a state where a left side camera of a vehicle is accommodated in a housing.

FIG. 3 is a view illustrating the external configuration of a side camera unit 70 in a state where the left side camera 53 of the vehicle 9 is accommodated in a housing. Since the side camera units 70 are symmetrically configured and arranged between left and right of the vehicle 9, the left side of the vehicle 9, which is the same as the right side thereof, will be described in detail as an example. As shown in the drawing, the side camera unit 70 is installed on the lower side of the mirror 93 through a bracket 79.

The side camera 53 is configured to be provided with a lens and an image pickup device. The side camera 53 is installed in the housing, and the optical axis is directed toward the outside of the vehicle 9. The side camera 53 is fixed to the housing so that the direction of the optical axis has a predetermined angle (for example, about 45 degrees) against the vertical direction.

<1-3. Image Conversion Processing>

Figure 4:
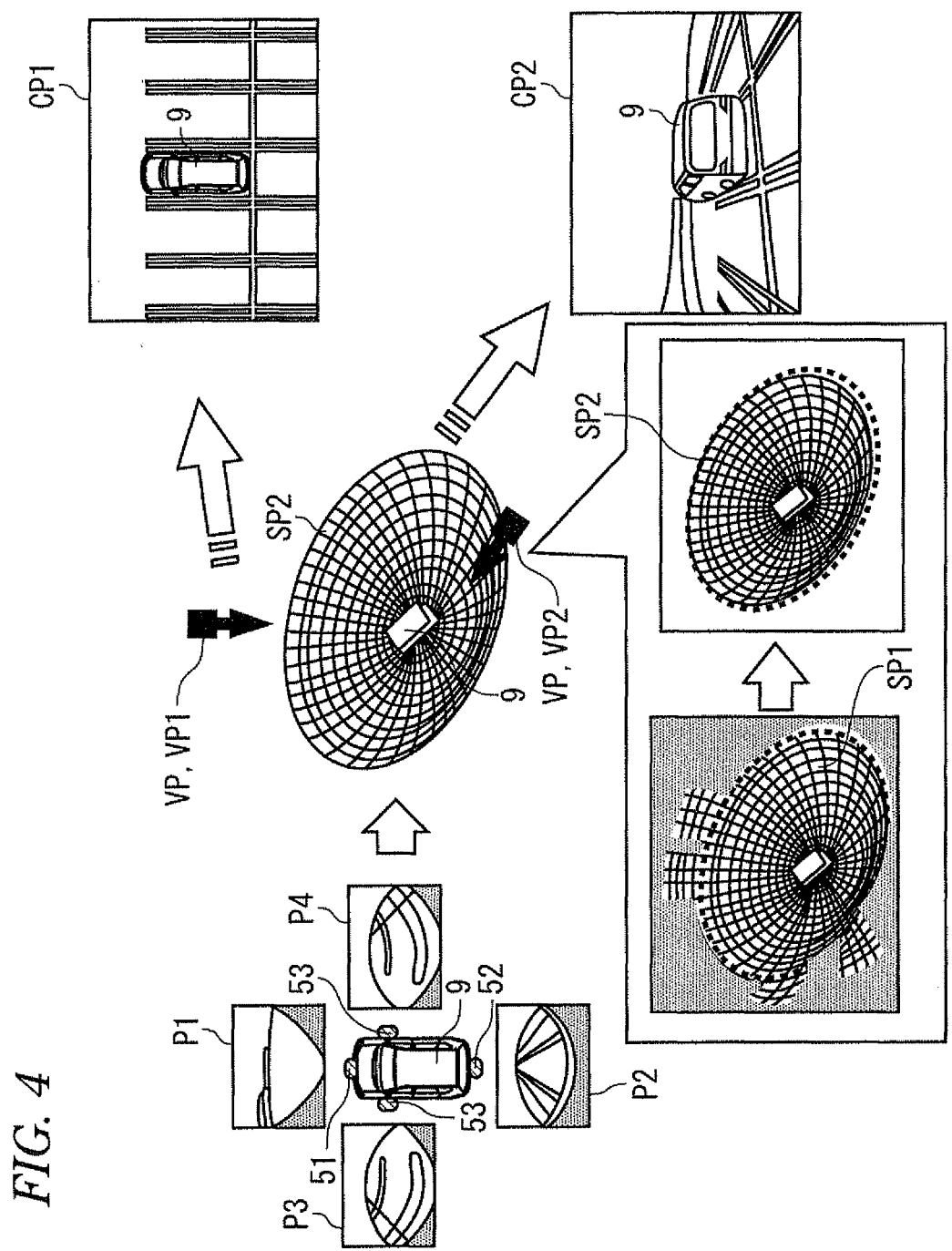
FIG. 4 is a view illustrating a technique of generating synthetic images.

Then, a technique in which the synthetic image generation unit 31 of the image generation unit 3 generates synthetic images showing the appearance of the periphery of the vehicle 9 viewed from a certain virtual viewpoint on the basis of captured images obtained by the capturing unit 5 will be described. In the case of generating the synthetic images, data for each vehicle model pre-stored in the non-volatile memory 4a is used. FIG. 4 is a view illustrating the technique of generating synthetic images.

If image capturing is performed simultaneously in the front camera 51, the back camera 52, and the side camera 53 of the capturing unit 5, four captured images P1 to P4 showing the front, rear, left, and right sides of the vehicle 9 are acquired. That is, the four captured images P1 to P4 acquired by the capturing unit 5 contain information showing the whole periphery of the vehicle 9 at the time of capturing.

Then, respective pixels of the four captured images P1 to P4 are projected onto a three-dimensional (3D) curved surface SP2 in a virtual three-dimensional space. The 3D curved surface SP2, for example, is substantially in a hemispheric shape (bowl shape), and the center portion thereof (the bottom portion of the bowl) is determined as the position in which the vehicle 9 is present. The correspondence relationship has been determined in advance between the positions of the respective pixels included in the captured images P1 to P4 and the positions of the respective pixels of the 3D curved surface SP2. Accordingly, the values of the respective pixels of the 3D surface SP2 can be determined on the basis of the values of the respective pixels included in the captured images P1 to P4.

On the other hand, in capturing the images P1 to P4, wide-angle cameras having an angle α of view of 180 degrees or more are used as the vehicle cameras 51, 52, and 53. In the case of capturing images using such a wide-angle camera, a part of the images may be blocked by an obstacle, such as a hood or a filter frame of the camera, to cause the reduction of light intensity in the peripheral area, and thus shading (a part having low brightness in the camera image) that is not intended by a photographer may occur on the screen. This shading phenomenon is generally called mechanical vignetting.

The 3D curved surface SP1 shown in FIG. 4 shows a state where the shading, which is caused by the reduction of the light intensity in a specified area around the 3D curved surface SP1, onto which the captured images P1 to P4 have been projected, occurs due to the occurrence of the mechanical vignetting on the part of the captured images. If the 3D curved surface having the shading is displayed on the navigation device 20 as it is, the synthetic images viewed from the predetermined virtual viewpoint may not be substantially in a hemispheric shape (bowl shape).

Due to this, synthetic images that correspond to a certain virtual viewpoint are generated using a 3D curved surface SP2 which is a center area that is substantially in a hemispheric shape (bowl shape) except for the peripheral area in which reduction of the light intensity occurs due to the mechanical vignetting of the 3D curved surface SP1. For example, as shown in FIG. 4, the 3D curved surface SP2 is determined by removing the peripheral area in which the reduction of the light intensity occurs due to the mechanical vignetting considering a dashed portion as a boundary of the 3D curved surface SP1. Through this, the images of the object that are substantially in a hemispheric shape (bowl shape) can be formed, and thus the images can be provided, from which a user can grasp the positional relationship between the vehicle and the obstacle that are displayed in 3D as if the user saw the top face down bowl from above.

The processing in the case where the light intensity is reduced due to the mechanical vignetting has been described as an example. However, the processing can also be applied in the case where the reduction of the light intensity except for the mechanical vignetting (for example, reduction of the light intensity due to optical vignetting) occurs. That is, areas having brightness that is lower than a reference value may be detected and removed from the captured images (camera images) obtained by the vehicle cameras 51, 52, and 53.

Further, the correspondence relationship between the positions of the respective pixels of the captured images P1 to P4 and the positions of the respective pixels of the 3D curved surface SP depends on the arrangement (mutual distance, height above ground, optical axis angle, and the like) of the four vehicle cameras 51, 52, and 53 on the vehicle 9. Because of this, table data that indicates the correspondence relationship is included in the data 4a for each vehicle model stored in the nonvolatile memory 40.

Further, polygon data that indicates the shape or size of the vehicle body included in the data 4a for each vehicle model is used, and a vehicle image that is a polygon model that shows the 3D shape of the vehicle 9 is virtually configured. The configured vehicle image is arranged in the center portion of the substantially hemispheric shape that corresponds to the position of the vehicle 9 in the 3D space in which the 3D curved surface SP is set.

Further, in the 3D space in which the 3D curved surface SP is present, the virtual viewpoint VP is set by the control unit 1. The virtual viewpoint VP is defined by the viewpoint position and the viewing direction, and is set at a certain viewpoint position that corresponds to the periphery of the vehicle and toward a certain viewing direction in the 3D space.

Then, depending on the set virtual viewpoint VP, a necessary area in the 3D curved surface SP2 as described above is cut off as the image. The relationship between the virtual viewpoint VP and the necessary area in the 3D curved surface SP is predetermined and pre-stored in the nonvolatile memory 40 as the table data. On the other hand, rendering is performed with respect to the vehicle image configured as a polygon to correspond to the set virtual viewpoint VP, and two-dimensional (2D) vehicle image that is the result of the rendering overlaps the cut image. Through this, synthetic images showing the appearance of the vehicle 9 and the periphery of the vehicle 9 viewed from a certain virtual time point are generated.

For example, if a virtual viewpoint VP1 is set in a state where the viewpoint position is a position directly above almost the center of the position of the vehicle 9, and the viewing direction is almost directly below of the vehicle 9, a synthetic image CP1 showing the appearance of the vehicle 9 (actually, vehicle image) and the periphery of the vehicle 9 viewed from almost directly, above of the vehicle 9 is generated. Further, as shown in the drawing, if a virtual viewpoint VP2 is set in a state where the viewpoint position is the left rear of the position of the vehicle 9, and the viewing direction is almost front of the vehicle 9, a synthetic image CP2 showing the appearance of the vehicle 9 (actually, vehicle image) and the periphery of the vehicle 9 viewed from the left rear of the vehicle 9 to the whole periphery thereof is generated.

On the other hand, in the case of actually generating the synthetic images, it is not necessary to determine the values of all the pixels of the 3D curved surface SP2, but by determining only the values of the pixels of the area that becomes necessary to correspond to the set virtual viewpoint VP on the basis of the captured images P1 to P4, the processing speed can be improved.

<1-4. Operating Mode>

Figure 5:
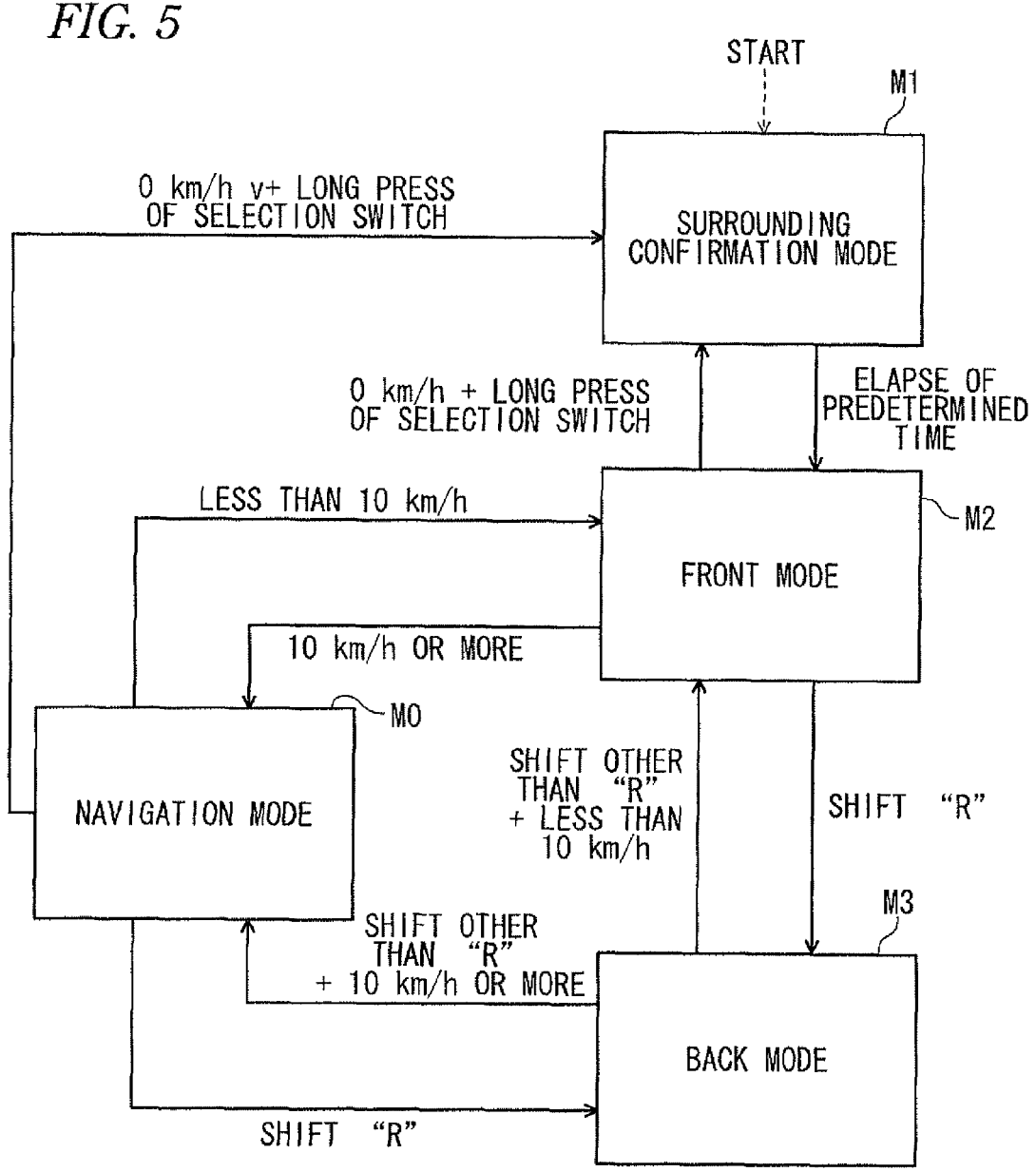
FIG. 5 is a diagram illustrating transition of an operating mode in an image processing system.

Then, the operating mode of the image processing system 120 will be described. FIG. 5 is a diagram illustrating transition of an operating mode in an image processing system 120. The image processing system 120 has four operating modes of a navigation mode M0, a surrounding confirmation mode M1, a front mode M2, and a back mode M3. These operating modes are switched under the control of the control unit 1 depending on the operation of the driver or the traveling state of the vehicle 9.

The navigation mode M0 is an operating mode in which a map image for a navigation guide is displayed on the display 21 by the function of the navigation device 20. In the navigation mode M0, the function of the image processing device 100 is not used, but various kinds of display are performed by the function of the navigation device 20 itself. Accordingly, in the case where the navigation device 20 has a function of receiving and displaying radio waves of television broadcasting, a television broadcasting screen may be displayed instead of the map image for the navigation guide.

By contrast, the surrounding confirmation mode M1, the front mode M2, and the back mode M3 are operating modes in which a display image showing the situation of the periphery of the vehicle 9 in real time is displayed on the display 21 using the function of the image processing device 100.

The surrounding confirmation mode M1 is an operating mode to perform animated representation that shows orbiting around the vehicle 9 as viewing the vehicle 9 downward. The front mode M2 is an operating mode in which a display image showing mainly the front or side of the vehicle 9 that is necessary during the forward movement of the vehicle 9 is displayed. Further, the back mode M3 is an operating mode in which a display image showing mainly the rear of the vehicle 9 that is necessary during the backward movement of the vehicle 9 is displayed.

If the image processing system 120 starts, the surrounding confirmation mode M1 is initially set. In the case of the surrounding confirmation mode M1, if a predetermined time (for example, 6 seconds) elapses after performing the animated representation that shows orbiting around the vehicle 9, the mode is automatically switched to the front mode M2. Further, in the case of the front mode M2, if the selection switch 43 is continuously pressed for a predetermined time in a state of 0 km/h (stopped state), the mode is switched to the surrounding confirmation mode M1. On the other hand, the mode may be switched from the surrounding confirmation mode M1 to the front mode M2 by a predetermined instruction from the driver.

Further, in the case of the front mode M2, if the traveling speed becomes, for example, 10 km/h or more, the mode is switched to the navigation mode M0. By contrast, in the case of the navigation mode M0, if the traveling speed input from vehicle speed sensor 82 becomes, for example, less than 10 km/h, the mode is switched to the front mode M2.

In the case where the traveling speed of the vehicle 9 is relatively high, the front mode M2 is released in order to concentrate on running the driver. By contrast, in the case where the traveling speed of the vehicle 9 is relatively low, the driver may drive a vehicle with more consideration of the situation around the vehicle 9, specifically, approaching to the intersection with poor visibility, changing directions, or moving toward the roadside. Due to this, in the case where the traveling speed is relatively low, the mode is switched from the navigation mode M0 to the front mode M2. On the other hand, in the case where the mode is switched from the navigation mode M0 to the front mode M2, the condition that there is an explicit operation instruction from the driver may be added to the condition that the traveling speed is less than 10 km/h.

Further in the case of the navigation mode M0, if the selection switch 43 is continuously pressed for a predetermined time, for example, in a state of 0 km/h (stopped state), the mode is switched to the surrounding confirmation mode M1. Further, if a predetermined time (for example, 6 seconds) elapses after performing the animated representation that shows orbiting around the vehicle 9, the mode is automatically switched to the front mode M2.

Further, in the case of the navigation mode M0 or the front mode M2, if the position of the shift lever that is input from the shift sensor 81 is "R (Reverse)", the mode is switched to the back mode M3. That is, if the transmission of the vehicle 9 is operated to the position of "R (Reverse)", the vehicle 9 moves backward, and thus the mode is switched to the back mode M3 mainly showing the rear of the vehicle 9.

On the other hand, in the case of the back mode M3, if the position of the shift lever is any position except for "R (Reverse)", the mode is switched to the navigation mode M0 or the front mode M2 on the basis of the traveling speed at that time. That is, if the traveling speed is 10 km/h or more, the mode is switched to the navigation mode M0, while if the traveling speed is less than 10 km/h, the mode is switched to the front mode M2.

Hereinafter, the display modes of the periphery of the vehicle 9 in the surrounding confirmation mode M1, the front mode M2, and the back mode M3 will be described in detail.

<1-5. Surrounding Confirmation Mode>

Figure 6:
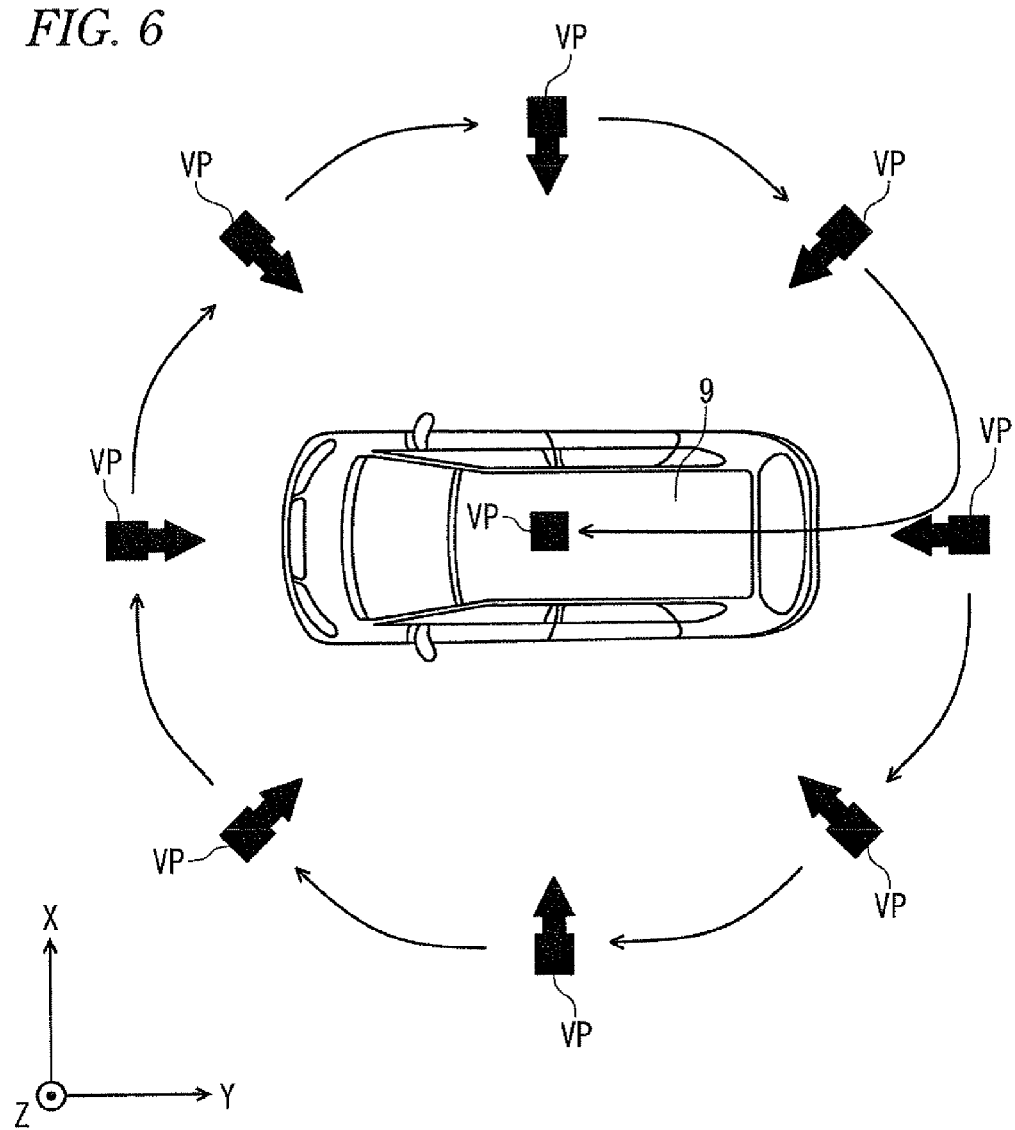
FIG. 6 is a view illustrating continuous movement of virtual viewpoints so as to orbit around a vehicle.

First, the display mode of the periphery of the vehicle 9 in the surrounding confirmation mode M1 will be described. In the surrounding confirmation mode M1, as shown in FIG. 6, the virtual viewpoint VP is set to view the vehicle 9 downward, and the virtual viewpoint VP is continuously moved so as to orbit around the vehicle 9. The virtual viewpoint VP is initially set to the rear of the vehicle 9, and then orbits around the vehicle 9 clockwise. Through this, if the virtual viewpoint VP is moved up to the rear of the vehicle through the left, front, and right sides of the vehicle 9, it is moved up to directly above of the vehicle 9.

In a state where the virtual viewpoint VP has been moved as described above, synthetic images are continuously generated. The generated synthetic images are sequentially output to the navigation device 20 and are continuously displayed on the display 21.

Figure 7:
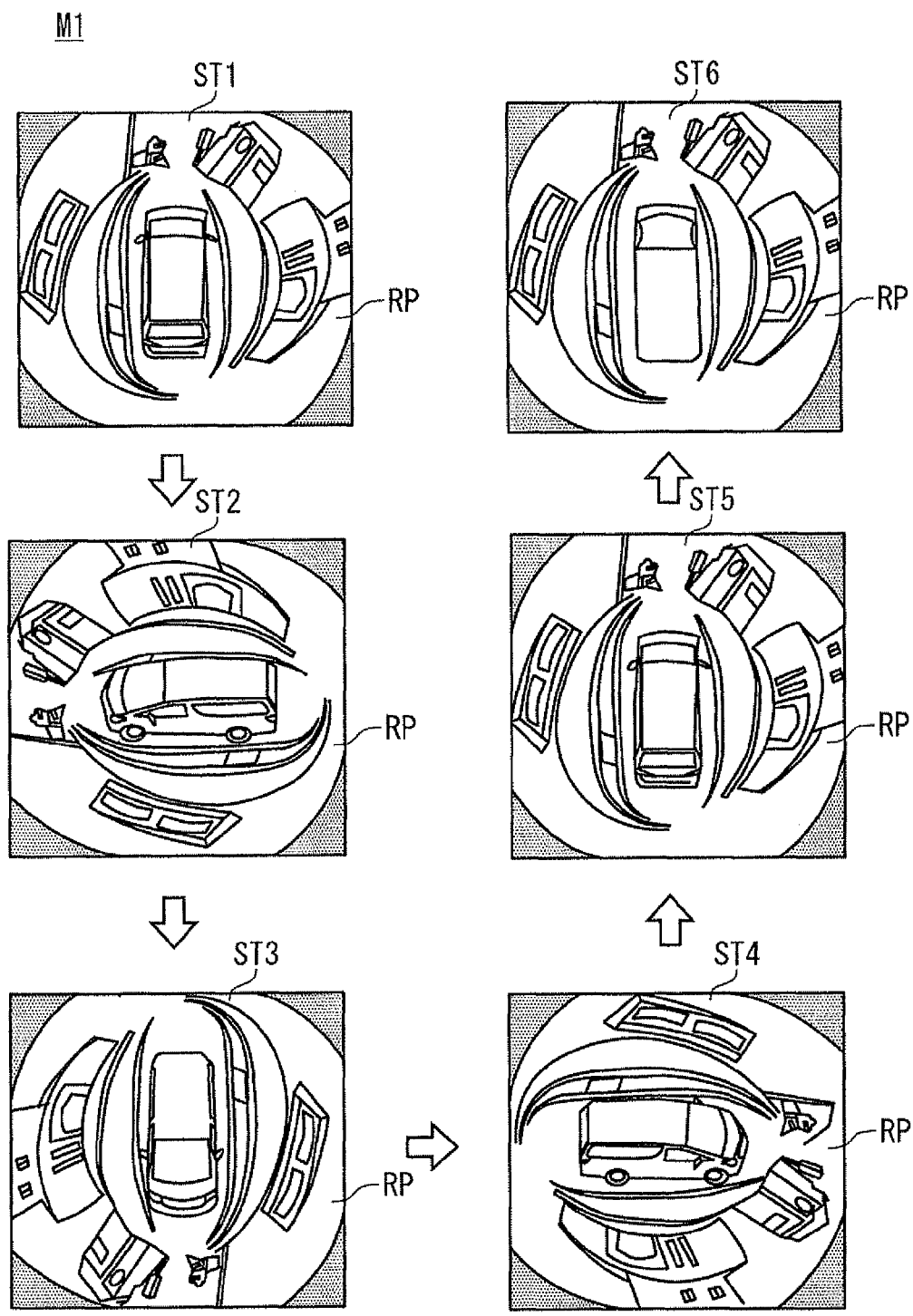
FIG. 7 is a view illustrating orbiting around a vehicle in a state where a downward view of the vehicle is taken.

Because of this, as shown in FIG. 7, animated representation is performed which shows orbiting around the vehicle 9 as viewing the vehicle 9 downward. In an example shown in FIG. 7, the synthetic images RP are displayed sequentially and continuously in the order of ST1 to ST6. Each of the synthetic images RP is a synthetic image that is generated on the basis of the 3D curved surface SP2 that is substantially in a hemispheric shape except for the peripheral area in which reduction of the light intensity occurs due to the mechanical vignetting of the 3D curved surface SP1, and is displayed in 3D as if the user saw the bowl from above. Due to this, the positional relationship between the vehicle and the obstacle can be easily grasped from the image. Further, the vehicle 9 is arranged in the vicinity of the center of the image, and the peripheral mode of the vehicle 9 can be confirmed together with the vehicle 9.

Further, in FIG. 7, a synthetic image ST1 (ST5) such as viewing the vehicle 9 downward from the rear of the vehicle 9, a synthetic image ST2 such as viewing the vehicle 9 downward from the left side of the vehicle 9, a synthetic image ST3 such as viewing the vehicle 9 downward from the front of the vehicle 9, a synthetic image ST4 such as viewing the vehicle 9 downward from the right side of the vehicle 9, and a synthetic image ST6 such as viewing the vehicle 9 downward from directly above (right above) of almost the center of the vehicle 9 are generated by the synthetic image generation unit 31 on the basis of the images input from the vehicle cameras 51, 52, and 53 of the capturing unit 5. The synthetic images ST1 to ST5 correspond to first download views according to the present invention, and the synthetic image ST6 corresponds to a second download view according to the present invention.

Then, as shown in FIG. 7, for example, by continuously displaying the images showing orbiting around the vehicle 9 as the user views the vehicle downward, for example, in the order of ST1→ST2→ST3→ST4→ST5→ST6 on the navigation device 20, the positional relationship between the vehicle and the obstacle can be intuitively grasped on one screen.

Further, by displaying both the synthetic images showing orbiting around the vehicle and the synthetic images viewed from directly above (right above) of almost the center of the vehicle while the position of the virtual viewpoint is moved with continuity, the user can intuitively grasp the positional relationship between the vehicle and the obstacle on one screen. Further, the safety around the vehicle can be confirmed from viewpoints around the vehicle and directly above (right above) of almost the center of the vehicle.

Further, even if information, such as an obstacle that is overlooked by the user, is present in the images of the periphery of the vehicle, it is possible to make a safety confirmation again by the image above the vehicle that is displayed with continuity after the image around the vehicle.

Further, it is not necessary for the user to confirm a wide range around the whole periphery of the vehicle at a time, and by continuously displaying the images of the whole vehicle in the wide range viewed from directly above (right above) of almost the center of the vehicle by images in a limited ranges around the vehicle, the user can perform the safety confirmation around the vehicle more accurately on one screen.

Further, by generating the synthetic images viewed from the virtual viewpoints moving around the vehicle in order centering around the position of the vehicle, the user can intuitively confirm the obstacles on the whole periphery of the vehicle on one screen.

On the other hand, the synthetic images as shown here are exemplary, and the user can optionally change the settings, such as height and direction of downward view of the vehicle of the synthetic image, temporary stop of continuous display of the synthetic image, adjustment of a rotating speed of the continuous display, reversing the rotation of the continuous display, and the like.

Further, a selected part can be enlarged to be displayed by selecting a certain part of the screen of the display unit according to the user's operation through a temporary stop of the continuous display. Further, in an embodiment of the present invention, a case where the synthetic images viewed from directly above (right above) of almost the center of the vehicle are continuously displayed after continuously displaying the synthetic images showing the periphery of the vehicle has been described. However, the continuous display of the synthetic images is not limited to this order, but the synthetic images around the vehicle may be continuously displayed after the synthetic images viewed from directly above (right above) of almost the center of the vehicle. Further, according to an embodiment of the present invention, orbiting around the vehicle Once from the position of the virtual viewpoints in the rear of the vehicle has been described. However, the start position for transition of the image is not specially limited, but an arbitrary position may be set as the start position. Further, the number of times orbiting around the vehicle is not limited to once, but may be an arbitrary number of times such as twice or more or a half.

Further, according to an embodiment of the present invention, by making the reception of an ACC-On signal from a vehicle power control device through the image processing device 100 or the navigation device 20 as the start condition of the confirming process around the vehicle, the user can confirm the periphery of the vehicle at the start of the image processing device. Typically, since the image processing device starts in response to the ACC-On before the traveling of the vehicle, the user can confirm the periphery of the vehicle before the traveling of the vehicle. The start condition for the vehicle around confirmation processing may be not only the reception of the ACC-ON signal but also the continuous pressing of the selection switch 43 for a predetermined time (for example, 3 seconds). Through this, the user can confirm the periphery of the vehicle any time when the user wants to automatically confirm the periphery of the user.

Further, the continuous display of the synthetic images may be finished by pressing a complete button (not illustrated) that is provided on the navigation device 20 even when the synthetic images are continuously displayed, or the vehicle around confirming process may not start by pressing the setting button (not illustrated), such as the ACC-ON or the selection switch 43, for a predetermined time.

By visually recognizing the animated representation in the surrounding confirmation mode M1, the user can confirm the situation of the whole periphery of the vehicle 9 from the viewpoint in front of the vehicle 9, and intuitively grasp the positional relationship between the obstacles on the whole periphery of the vehicle and the vehicle 9.

<1-6. Front Mode>

Figure 8:
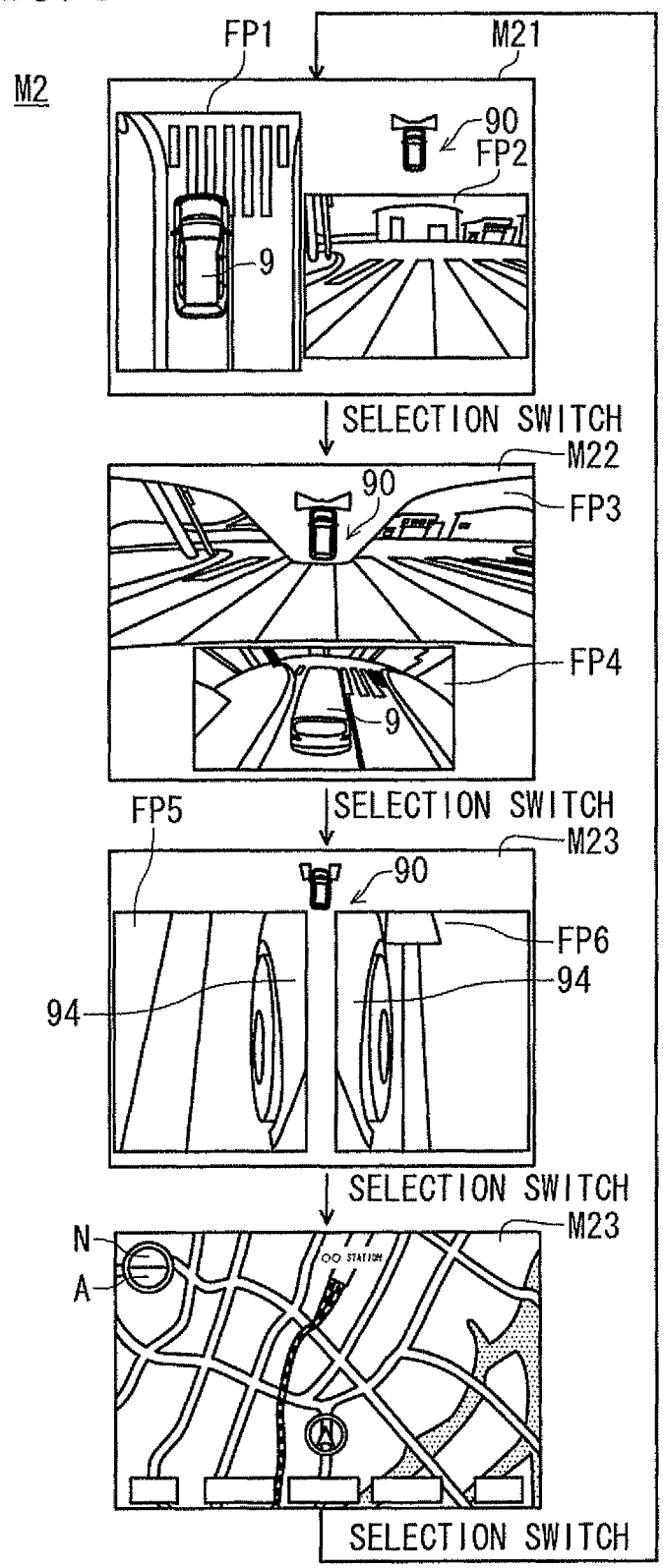
FIG. 8 is a view illustrating transition of a display mode in a front mode.

Then, the display mode of the periphery of the vehicle 9 in the front mode M2 will be described. FIG. 8 is a view illustrating transition of the display mode in the front mode M2. The front mode M2 includes four display modes of a traveling downward view mode M21, a vehicle confirmation mode M22, a side camera mode M23, and the navigation mode M24, and these display modes have different display types. On the screens of the display modes M21, M22, and M23, visual field guides 90 indicating the visual field ranges in the respective display modes are displayed, and indicate which area of the periphery of the vehicle 9 is displayed with respect to the user. Further, in the navigation mode M24, a map image around the vehicle 9 is displayed, and the display of the current position of the vehicle 9 is also performed.

Whenever the user presses the selection switch 43 the traveling downward view mode M21, the vehicle confirmation mode M22, the side camera mode M23, and the navigation mode M24 are switched in order under the control of the control unit 1. If the selection switch 43 is pressed in the navigation mode M24, the mode returns again to the traveling downward view mode M21.

The traveling downward view mode M21 is a display mode for displaying, on the display 21, a screen that contains the synthetic image FP1 showing the appearance of the vehicle 9 viewed from the virtual viewpoint VP directly above the vehicle 9 and the front image FP2 obtained by capturing through the front camera 51 side by side. That is, in the traveling downward view mode M21, two images of the synthetic image FP1 showing the whole periphery of the vehicle 9 and the front image FP2 showing the front of the vehicle 9 are displayed on the same screen.

In the traveling downward view mode M21, since two images FP1 and FP2 can be read, the user can confirm the situation of the front that is the traveling direction of the vehicle 9 together with the whole periphery of the vehicle 9 at a glance. The traveling downward view mode M21 may be a display mode that can be used with high versatility on various kinds of scenes during the straight traveling.

Further, the vehicle confirmation mode M22 is a display mode for displaying, on the display 21, a screen that contains the front image FP3 obtained by capturing through the front camera 51 and the synthetic image FP4 showing the appearance of the vehicle 9 viewed from the virtual viewpoint VP in the rear of the vehicle 9 side by side. That is in the vehicle confirmation mode M22, two image of the front image FP3 showing the front of the vehicle 9 and the synthetic image FP4 showing the side of the vehicle 9 are displayed on the same screen.

The front image FP3 in the vehicle confirmation mode M22 has a wide viewing range in left and right directions in comparison to the front image FP2 in the traveling downward view mode M21. Because of this, objects, which are present in front of the front end of the vehicle 9 that easily becomes a blind spot when the vehicle enters into an intersection with poor visibility and in the left and right directions, can be confirmed.

Further, according to the synthetic image FP4 in the vehicle confirmation mode M22, since the position of the virtual viewpoint VP is moved to the rear of the vehicle 9 in comparison to the synthetic image FP1 in the traveling downward view mode M21, the area showing the rear of the vehicle 9 becomes narrowed, but it is easy to confirm the side of the vehicle 9. Due to this, when oncoming vehicles pass each other, the clearance between the oncoming vehicles can be easily confirmed.

Since two images FP3 and FP4 can be read in the vehicle confirmation mode M22, the user can confirm the situation of the area to be confirmed at a glance in satiations that require careful driving, such as in the case where the vehicle enters into the intersection with poor visibility or the oncoming vehicles pass each other.

Further, the side camera mode M23 is a display mode for displaying, on the display 21, a screen that contains side images FP5 and FP6 obtained by capturing through left and right side cameras 53 side by side. The side images FP5 and FP6 show only the outer side of the front fender 94 that easily becomes a blind spot from the driver's seat.

Since two images FP3 and FP4 can be read in the side camera mode M23, the user can easily confirm the situation of the area to be confirmed in the case of moving toward the roadside.

The navigation mode M24 is an operating mode for displaying, on the display 21, a map image for the navigation guide by the function of the navigation device 20. In the navigation mode M24, the function of the image processing device 100 is not used, but various kinds of display are performed by the function of the navigation device 20 itself. Accordingly, in the case where the navigation device 20 has a function of receiving and displaying radio waves of television broadcasting, a television broadcasting screen may be displayed instead of the map image for the navigation guide.

<1-7. Back

Figure 9:
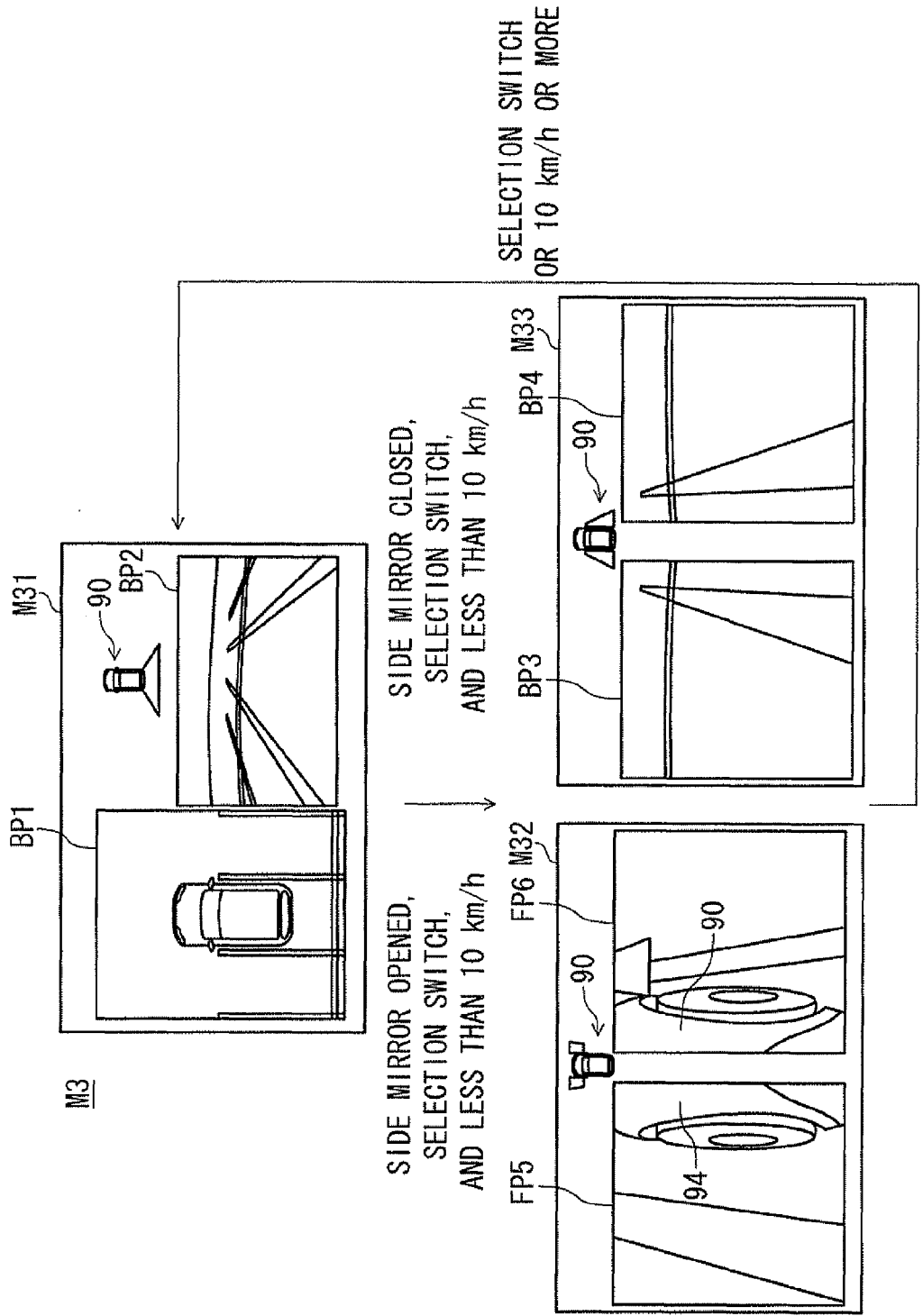
FIG. 9 is a view illustrating transition of a display mode in a back mode.

Then, the display mode of the periphery of the vehicle 9 in the back mode M3 will be described. FIG. 9 is a view illustrating transition of the display mode in the back mode M3. The back mode M3 includes three display modes of a parking downward view mode M31, a front door mirror mode M32, and a rear door mirror mode M33, and these display modes have different display types. On the screens of the display modes, visual field guides 90 indicating the visual field ranges in the respective display modes are displayed, and indicate which area of the periphery of the vehicle 9 is displayed with respect to the user.

The display modes of the front door mirror mode M32 and the rear door mirror mode M33 are switched from the parking downward view mode M31 under the control of the control unit 1 depending on the state of the door mirror 93 that is input from the mirror driving device 86. Specifically, if the position of the shift lever is operated to "R (Reverse)", the mode is switched to the parking downward view mode M31. In the parking downward view mode M31, the door mirror 93 is opened to be in a typical state, and if the selection switch 43 is pressed by the user in the case where the vehicle speed of the vehicle 9 is less than 10 km/h, the mode is switched to the front door mirror mode M32.

In the front door mirror mode M32, the image range, which contains the outer side of the front fender of the vehicle 9 of the image captured by the side cameras 53 provided on the door mirror 93, is selected by the image range selection unit 32 of the image generation unit 3. Further, the image information is output through the navigation communication unit 42 by the image information output unit 33, and is displayed on the navigation device 20. Through this, the user can easily confirm the situation of the area to be confirmed in the case of moving toward the roadside.

Further, in the parking downward view mode M31, if the selection switch 43 is pressed by the user in the case where the door mirror 93 is closed and the vehicle speed of the vehicle 9 is less than 10 km/h, the mode is switched to the rear door mirror mode M33.

In the rear door mirror mode M33, an image range of the image that is captured by the side cameras 53 provided on the door mirrors 93, which is almost the same as the range that is reflected in the door mirror that is in an opened state, is selected. Specifically, the image range showing the rear of the side area of the vehicle is selected. Through this, even in a state where the door mirror is closed while the vehicle passes through a narrow place, the user can confirm the image (appearance of the object) in the range of almost the same as that in the case where the door mirror is opened.

Further, the parking downward view mode M31 is a display mode for displaying, on the display 21, a screen that contains the synthetic image BP1 showing the appearance of the vehicle 9 viewed from the virtual viewpoint VP directly above the vehicle 9 and the back image BP2 obtained by capturing through the back camera 52 side by side. That is, in the parking downward view mode M31, two images of the synthetic image BP1 showing the whole periphery of the vehicle 9 and the back image BP2 showing the rear of the vehicle 9 are displayed on the same screen.

Further, in the parking downward view mode M31, since two images BP1 and BP2 can be read, the user can confirm the situation of the rear that is the traveling direction of the vehicle 9 together with the whole periphery of the vehicle 9 at a glance. The parking downward view mode M31 may be a display mode that can be used with high versatility on various kinds of scenes during the backward movement of the vehicle 9.

On the other hand, in addition to the parking downward view mode M31, a column guide mode displaying a synthetic image viewed from a predetermined virtual viewpoint of the rear of the vehicle when the vehicle 9 performs parallel parking and other modes such as a back guide mode displaying a parking guide line on the back image BP2 showing the rear of the vehicle 9 may be provided, and changeover from any one of the above-described modes to the front door mirror mode M32 or the rear door mirror mode M33 may be performed depending on the opening/closing state of the door mirror.

Further, the front door mirror mode M32 is a display mode for displaying, on the display 21, a screen that contains the side images FP5 and FP6 obtained by capturing through the left and right side cameras 53 side by side. Since two images F5 and FF6 can be read on one screen in the front door mirror mode M32, the user can confirm the image containing the outer side of the left and right front fenders having some risk of collision in the case where the user moves the vehicle backward.

Further, the rear door mirror mode M33 is a display mode for displaying, on the display 21, a screen that contains the side images BP3 and BP4 obtained by capturing through the left and right side cameras 53 side by side. Since two images BP3 and BP4 can be read on one screen in the rear door mirror mode M33, it is possible to move the vehicle backward as confirming the left and right sides of the rear of the vehicle 9 on the same screen.

Figure 10:
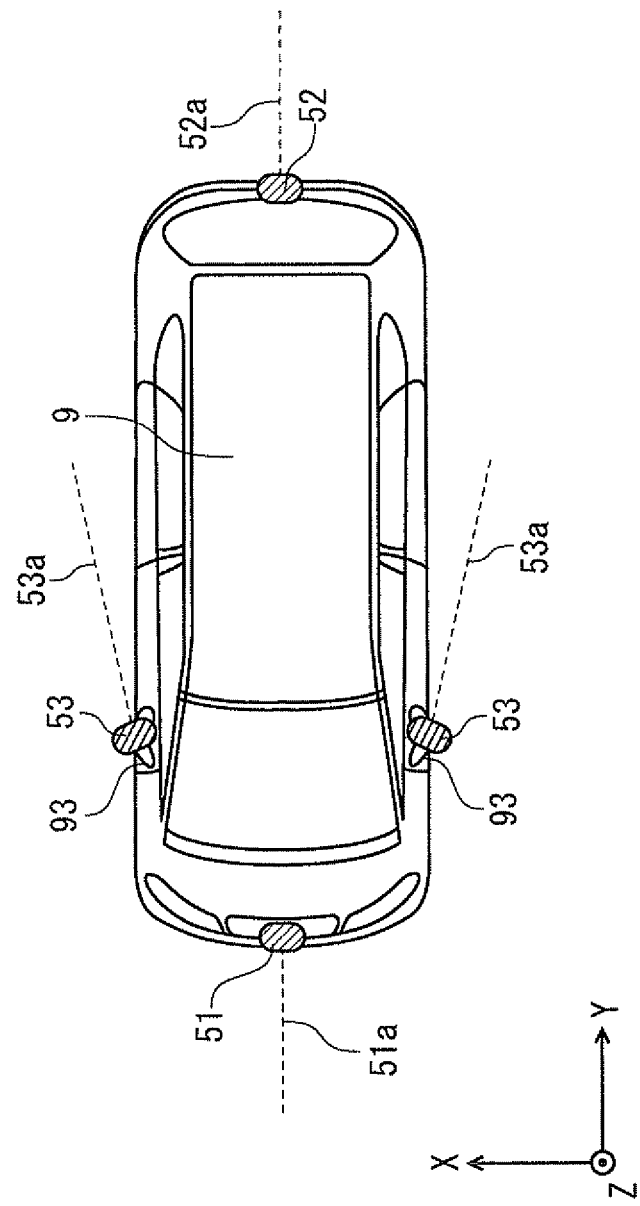
FIG. 10 is a view illustrating the direction of an optical axis when a door mirror is closed.

As shown in FIG. 10, the side cameras 53 are provided on the door mirrors 93, and if the door mirrors 93 are in a closed state, the direction of the optical axis 53*a* is directed toward the rear of the vehicle 9. In this state, it is not possible to acquire the image showing the whole side of the vehicle 9 through the side cameras 53, and it is difficult to generate synthetic images from certain virtual viewpoints. However, since the optical axis 53*a* is moved toward the rear of the vehicle 9, captured images having relatively low distortion can be acquired with respect to the rear of the side area of the vehicle 9. In the rear door mirror mode M33, two images BP3 and BP4 showing the rear of the side area of the vehicle 9 are generated and displayed using the captured images acquired by the side cameras 53.

Since the two images BP3 and BP4 can be read in the rear door mirror mode M33, the user can confirm almost the same range as the range that is reflected in the door mirror 93 even in a state where the door mirror should be closed due to the parking environment.

2. OPERATION

<2-1. Operation in the Surrounding Confirmation Mode>

Figure 11:
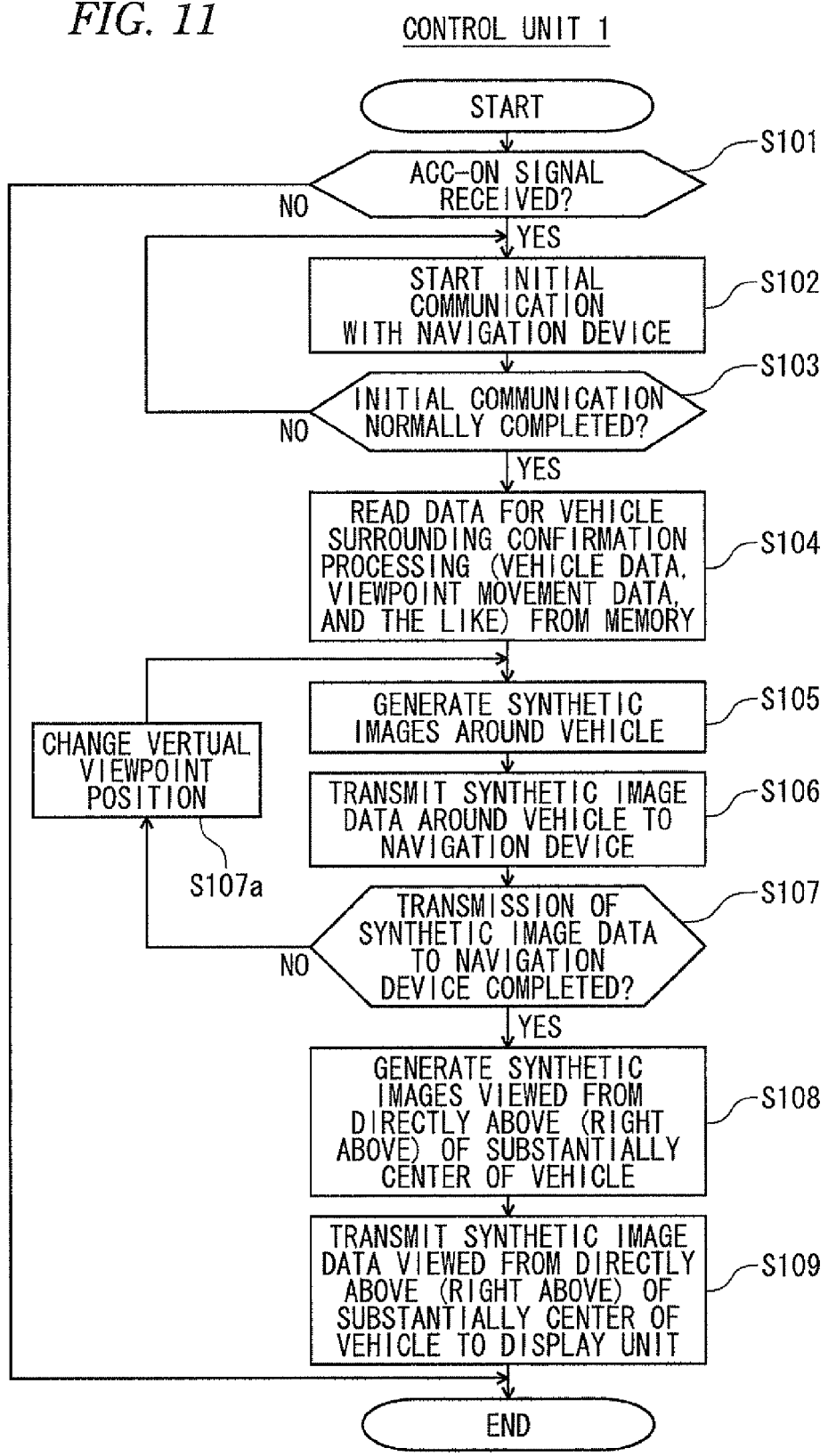
FIG. 11 is a diagram illustrating a processing flow of a control unit of an image processing system in a surrounding confirmation mode.

Then, a flow of processing through the control unit of the image processing system in the surrounding confirmation mode will be described using FIG. 11. If the control unit 1 of the image processing device 10 receives the ACC-On signal from a vehicle power control device (not illustrated) through the signal input unit 41 ("Yes" in step S101), the control unit 1 starts an initial communication with the navigation device 20 through the navigation communication unit 42 (step S102). Here, the initial communication means a process of conforming whether communication is possible between the control unit 1 of the image processing device 10 and the navigation device 20. If the control unit 1 does not receive the ACC-On signal from the vehicle power control device ("No" in step S101), the processing is finished.

If the initial communication between the control unit 1 and the navigation device 20 is normally completed ("Yes" in step S103), the control unit 1 reads data for vehicle surrounding confirmation processing from the nonvolatile memory 40 (step S104). Examples of vehicle surrounding confirmation processing data include bitmap data of the vehicle and movement data of a viewpoint (viewpoint position for each time or direction data of a viewpoint).

If the initial communication is not normally completed ("No" in step S103), the control unit 1 performs communication with the navigation device 20 again, and if the communication is not possible even attempt to communicate more than once, the processing is finished. In the case where the initial communication is not normally completed, the control unit 1 may not operate normally due to a malfunction. In this case, a warning that the system for displaying images of the periphery of the vehicle has failed may be displayed on the navigation device 20.

After reading the data for the vehicle surrounding confirmation processing from the nonvolatile memory 40, the image generation unit 3 of the control unit 1 generates synthetic images of the periphery of the vehicle on the basis of the read data (step S105). In generating the synthetic images, a process of generating the synthetic images that correspond to certain virtual viewpoints is performed using the 3D curved surface SP2 which is the area that is substantially in the hemispheric shape (bowl shape) except for the peripheral area in which reduction of the light intensity occurs due to the mechanical vignetting of the 3D curved surface SP1 as illustrated in FIG. 4. Then, the generated synthetic image data is transmitted to the navigation device 20 (step S106).

The image generation unit 3 generates synthetic images (step S105) while changing the position of the virtual viewpoint in stages (step S107a). Then, the control unit 1 transmits data to the navigation device 20 so that the synthetic images have continuity. Through this, the position of the virtual viewpoint is continuously changed, and the images orbiting around the vehicle 9 can be displayed on the navigation device 20 in a state where the vehicle 9 is viewed downward through the continuous display.

If the transmission of the synthetic images to the navigation device 20 is completed ("Yes" in step S107), the synthetic images viewed from directly above (right above) of almost the center of the vehicle 9 are generated through the same processing as the synthetic images of the periphery of the vehicle (step S108), and the generated synthetic images viewed from directly above (right above) of almost the center of the vehicle 9 are transmitted to the navigation device 20 (step S109). Through this, the synthetic images appearing to orbit around the vehicle in a state where the vehicle is viewed downward are displayed on the display device, and the user can intuitively grasp the positional relationship between the vehicle and the obstacle on one screen by confirming the whole periphery of the vehicle from the user's viewpoint in front of the vehicle.

<2-2. Operation in the Back Mode>

Figure 12:
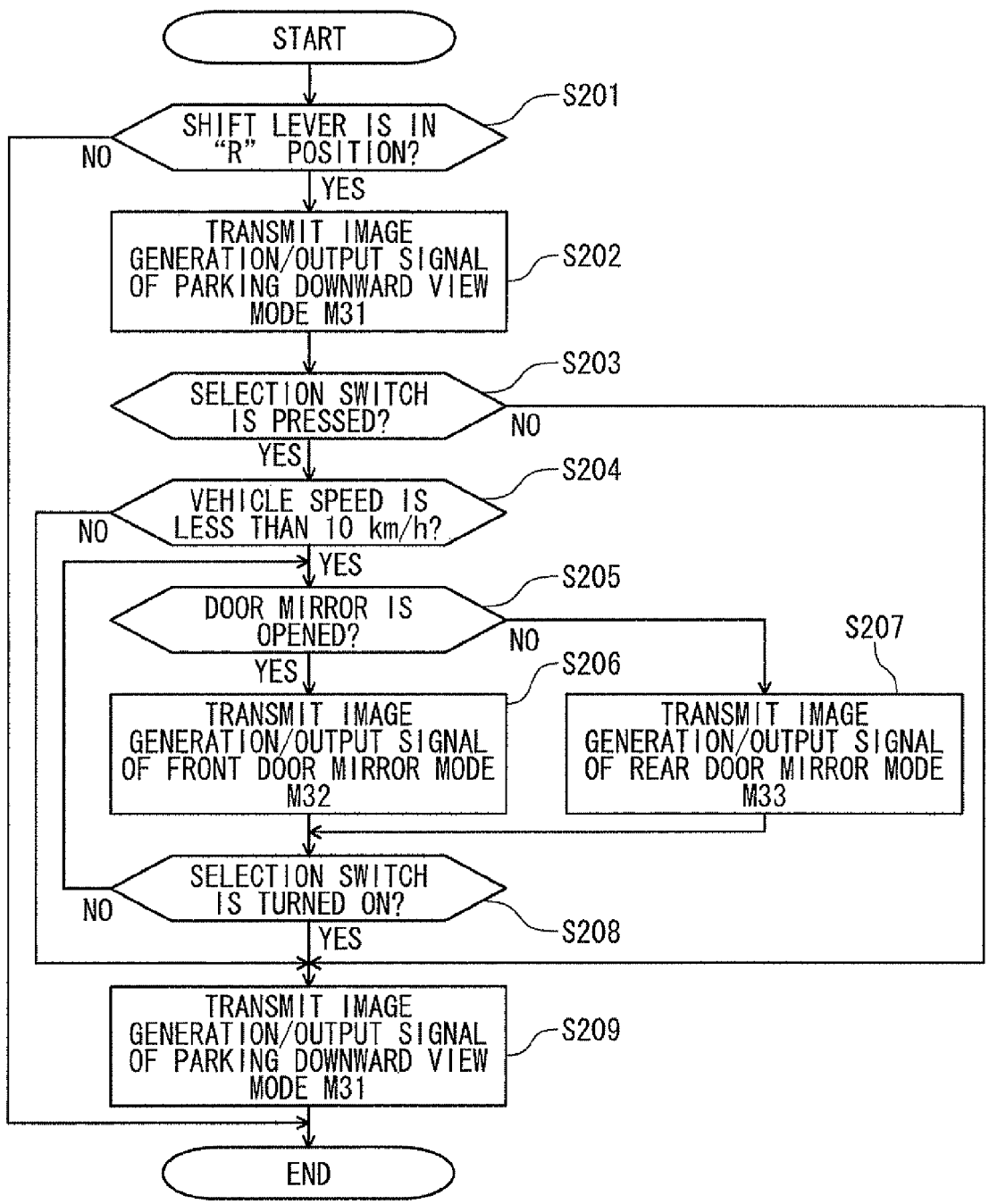
FIG. 12 is a diagram illustrating a processing flow of a control unit of an image processing system in a back mode.

Then, a flow of a process of selecting the captured image range depending on the opening/closing state of the door mirror 93 as described above and outputting image information will be described. FIG. 12 is a diagram illustrating a processing flow of the control unit of the image processing system in the back mode. First, in order to determine whether the mode of the image processing system is the back mode, it is determined whether the operation position of the shift lever is the shift position of "R (Reverse)" (step S201).

If the operation position of the shift lever is set to "R (Reverse)" ("Yes" in step S201), the control unit 1 of the back mode M3 transmits, to the image generation unit 3, instruction signals for generating images in the parking downward view mode M31 and outputting the image information to the navigation device 20 (step S202). On the other hand, if the position of the operation of the shift lever is not set to the shift position of "R (Reverse)" ("No" in step S201), the processing is finished.

Then, if the user presses the selection switch 43 in the case where the image of the parking downward view mode M31 is displayed on the navigation device 20 ("Yes" in step S203), the control unit 1 determines whether the vehicle speed of the vehicle 9 is less than 10 km/h (step S204). On the other hand, if the user does not press the selection switch 43 ("No" in step S203), the control unit 1 continues the processing for displaying the parking downward view mode M31 on the navigation device 20 (step S209).

In step S204, if the vehicle speed is less than 10 km/h ("Yes" in step S204), the control unit 1 determines whether the door mirrors 93 of the vehicle 9 are opened (step S205).

In step S205, if the door mirrors 93 are opened ("Yes" in step S205), the control unit 1 transmits an instruction signal for performing the processing of the front door mirror mode M32 to the image generation unit 3 (step S206), and proceeds to the next process. Specifically, the control unit 1 selects the image range that contains the outer side of the front fenders of the imaged captured using the side cameras 53, and transmits the instruction signal for outputting the image information of the selected range to the image generation unit 3. Through this, the user can easily confirm the situation of the area to be confirmed in the case of moving toward the roadside or the like.

On the other hand, if the vehicle speed of the vehicle 9 is not less than 10 km/h ("No" in step S204), the control unit 1 continues the processing for displaying the parking downward view mode M31 on the navigation device 20 (step S209).

Further, if the door mirror 93 is closed ("No" in step S205), the control unit 1 transmits the instruction signal for performing the processing of the rear door mirror mode M33 to the image generation unit 3 (step S207), and proceeds to the next process. The control unit 1 transmits an instruction signal for selecting the image range of the images captured using the side cameras, which is almost the same as the range that is reflected in the door mirror that is in an opened state, and transmits an instruction signal for outputting the image information of the selected range to the image generation unit 3. Specifically, the control unit 1 transmits the instruction signal for selecting the image range showing the rear of the side area of the vehicle and transmits the instruction signal for outputting the image information of the selected range to the image generation unit 3. Through this, even in a state where the door mirror is closed while the vehicle passes through a narrow place, the user can confirm the image (appearance of the object) in the range of almost the same as that in the case where the door mirror is opened.

Then, if the selection switch 43 is not pressed by the user ("No" in step S208), the control unit 1 returns to the processing in step S205, and transmits a signal for instructing the image generation unit 3 to select the image that corresponds to any one of the front door mirror mode M32 and the rear door mirror mode 33 and to output the image information depending on the opening/closing state of the door mirrors 93.

On the other hand, if the selection switch 43 is pressed by the user ("Yes" in step S208), in the same manner as the process described in step S202, the control unit 1 generates images of the parking downward view mode M31, and transmits the instruction signal for outputting the image information to the navigation device 20 to the image generation unit 3 (step S209).

In the above-described process, the control unit 1 determines whether the vehicle speed of the vehicle 9 is less than 10 km/h in step S204 after determining whether the selection switch is pressed in step S203. By contrast, the control unit 1 may first determine whether the vehicle speed of the vehicle 9 is less than 10 km/h and then determine whether the selection switch is pressed.

Further, in the embodiment of the present invention, it is exemplified that in the case where the mode of the image processing system 120 is the back mode, that is, in the case where the vehicle 9 moves backward, any one of the front door mirror mode M32 and the rear door mirror mode M33 is displayed depending on the opening/closing state of the door mirrors 93. However, it is also possible to display any one of the front door mirror mode M32 and the rear door mirror mode M33 depending on the opening/closing state of the door mirrors 93 in the case where the mode of the image processing system 120 is the front mode, that is, in the case where the vehicle 9 moves forward.

3. MODIFIED EXAMPLES

Although the embodiments of the present invention have been described, the present invention is not limited to the described embodiments, and various modifications may be made. Hereinafter, such modified examples will be described. All forms including the forms described in the above-described embodiments and forms to be described hereinafter may be appropriately combined.

In the above-described embodiment, the image processing device 100 and the navigation device 20 are described as different devices. However, the image processing device 100 and the navigation device 20 may be configured to be arranged in the same housing as an integrated device.

Further, in the above-described embodiment, the display device that displays the image generated by the image processing device 100 is the navigation device 20. However, the display device may be a general display device having no special function such as the navigation function.

Further, in the above-described embodiment, a part of the function that is realized by the control unit 1 of the image processing device 100 may be realized by the control unit 23 of the navigation device 20.

Further, in the above-described embodiment, a part or all of the signals that are input to the control unit 1 of the image processing device 100 through the signal input unit 41 may be input to the navigation device 20. In this case, it is preferable that the signals are input to the control unit 1 of the image processing device 100 through the navigation communication unit 42.

Further, in the above-described embodiment, the direction indication that is intended by the driver of the vehicle 9 is input from the direction indicator 83. However, the direction indication may be input by another means. For example, the movement of the deriver's viewpoint may be detected from the image of the driver's eye and the direction indication that is intended by the driver may be input depending on the detection result.

Further, in the above-described embodiment, various kinds of functions are realized by software through the arithmetic operation of the CPU according the program. However, a part of these functions may be realized by an electrical hardware circuit. By contrast, a part of the functions that are realized by the hardware circuit may be realized by software.

Priority is claimed on Japanese Patent Application No. 2009-291878 filed in the Japan Patent Office on Dec. 24, 2009, the contents of which are incorporated herein by reference.

The invention claimed is:

1. An image processing device configured to be installed in a vehicle, comprising:
    an image acquirer configured to acquire camera images captured by cameras provided on the vehicle, the camera images containing information showing the whole periphery of the vehicle at the time of capturing the camera images;
    a synthetic image generator configured to generate synthetic images based on the camera images, the synthetic images including first downward views of the vehicle and a periphery thereof viewed from virtual viewpoints different from one another; and
    a display image provider configured to output, to a display device installed in the vehicle, information corresponding to a display image in which the synthetic images are continuously reproduced so as to perform an animated representation that shows orbiting around the vehicle, wherein the animated representation is started under a predetermined condition and a display mode is continuously changed in a predetermined order,
    wherein the display mode includes:
        a surrounding confirmation mode in which the information corresponding to the display image is output to the display device so as to perform the animated representation;
        a front mode in which information corresponding to an image including a front of the vehicle is output to the display device;
        a navigation mode in which information corresponding to a map image for a navigation guide is output to the display device; and
        a back mode in which information corresponding to an image including a rear of the vehicle is output to the display device, and
    wherein in the predetermined order is an order in which the surrounding confirmation mode is switched to the front mode when a predetermined time elapses after the surrounding confirmation mode starts, the front mode is switched to the navigation mode when a speed of the vehicle becomes equal to or more than a predetermined speed after the front mode starts, and the navigation mode is switched to the back mode when a shift lever of the vehicle is switched to a reverse position after the navigation mode starts.

2. The image processing device according to claim 1, wherein the synthetic images includes a second downward view of the vehicle and the periphery thereof viewed from right above of the vehicle; and
    wherein the second downward view is reproduced at least once while the first downward views are reproduced, as the display image.

3. The image processing device according to claim 1, wherein each of the first downward views shows the vehicle at a center thereof.

4. The image processing device according to claim 2, wherein each of the first downward views shows the vehicle at a center thereof.

5. The image processing device according to claim 1, wherein the synthetic image generator is configured to generate the synthetic images when the image processing device is activated.

6. The image processing device according to claim 1, wherein the synthetic image generator is configured to eliminate a part of the camera images having a brightness lower than a reference value when the synthetic image is generated.

7. An image processing system comprising:
a plurality of cameras configured to be provided on a vehicle; and
an image processing device configured to be installed in the vehicle, comprising:
an image acquirer configured to acquire camera images captured by the cameras, the camera images containing information showing the whole periphery of the vehicle at the time of capturing the camera images;
a synthetic image generator configured to generate synthetic images based on the camera images, the synthetic images respectively being downward views of the vehicle and a periphery thereof viewed from virtual viewpoints different from one another; and
a display image provider configured to output, to a display device installed in the vehicle, information corresponding to a display image in which the synthetic images are continuously reproduced so as to perform an animated representation that shows orbiting around the vehicle, wherein the animated representation is started under a predetermined condition and a display mode is continuously changed in a predetermined order,
wherein the display mode includes:
a surrounding confirmation mode in which the information corresponding to the display image is output to the display device so as to perform the animated representation;
a front mode in which information corresponding to an image including a front of the vehicle is output to the display device;
a navigation mode in which information corresponding to a map image for a navigation guide is output to the display device; and
a back mode in which information corresponding to an image including a rear of the vehicle is output to the display device, and
wherein in the predetermined order is an order in which the surrounding confirmation mode is switched to the front mode when a predetermined time elapses after the surrounding confirmation mode starts, the from mode is switched to the navigation mode when a speed of the vehicle becomes equal to or more than a predetermined speed after the front mode starts, and the navigation mode is switched to the back mode when a shift lever of the vehicle is switched to a reverse position after the navigation mode starts.

8. An image processing method, comprising:
acquiring camera images captured by cameras provided on a vehicle, the camera images containing information showing the whole periphery of the vehicle at the time of capturing the camera images;
generating synthetic images based on the camera images, the synthetic images respectively being downward views of the vehicle and a periphery thereof viewed from virtual viewpoints different from one another; and
outputting, to a display device installed in the vehicle, information corresponding to a display image in which the synthetic images are continuously reproduced so as to perform an animated representation that shows orbiting around the vehicle, wherein the animated representation is started under a predetermined condition and a display mode is continuously changed in a predetermined order,
wherein the display mode includes:
a surrounding confirmation mode in which the information corresponding to the display image is output to the display device so as to perform the animated representation;
a front mode in which information corresponding to an image including a front of the vehicle is output to the display device;
a navigation mode in which information corresponding to a map image for a navigation guide is output to the display device; and
a back mode in which information corresponding to an image including a rear of the vehicle is output to the display device, and
wherein in the predetermined order is an order in which the surrounding confirmation mode is switched to the front mode when a predetermined time elapses after the surrounding confirmation mode starts, the front mode is switched to the navigation mode when a speed of the vehicle becomes equal to or more than a predetermined speed after the front mode starts, and the navigation mode is switched to the back mode when a shift lever of the vehicle is switched to a reverse position after the navigation mode starts.

9. The image processing device according to claim 1, wherein the display image provider outputs the information corresponding to the display image in which the synthetic images are continuously reproduced so as to perform the animated representation that shows orbiting around the vehicle when a predetermined operation is performed when the vehicle is in a stopped state.

10. The image processing system according to claim 7, wherein the display image provider outputs the information corresponding to the display image in which the synthetic images are continuously reproduced so as to perform the animated representation that shows orbiting around the vehicle when a predetermined operation is performed when the vehicle is in a stopped state.

11. The image processing method according to claim 8, wherein the information corresponding to the display image in which the synthetic images are continuously reproduced so as to perform the animated representation that shows orbiting around the vehicle is output when a predetermined operation is performed when the vehicle is in a stopped state.

12. The image processing device according to claim 1, wherein the predetermined condition for starting the animated representation includes at least one of (i) an activation of the image processing device and (ii) a predetermined input operation by a user while the vehicle is in a stopped state.

13. The image processing system according to claim 7, wherein the predetermined condition for starting the animated representation includes at least one of (i) an activation of the image processing device and (ii) a predetermined input operation by a user while the vehicle is in a stopped state.

14. The image processing method according to claim 8, wherein the predetermined condition for starting the animated representation includes at least one of (i) an activation of an image processing device and (ii) a predetermined input operation by a user while the vehicle is in a stopped state.

15. The image processing device according to claim 1, wherein the animated representation shows orbiting around an entire periphery of the vehicle.

16. The image processing system according to claim 7, wherein the animated representation shows orbiting around an entire periphery of the vehicle.

17. The image processing method according to claim 8, wherein the animated representation shows orbiting around an entire periphery of the vehicle.

* * * * *